(12) United States Patent
Cullen et al.

(10) Patent No.: US 10,563,640 B2
(45) Date of Patent: Feb. 18, 2020

(54) OPTIMISED DIAMETRIC CONTRACTION OF A SMA ELEMENT FOR USE IN AN ENERGY RECOVERY DEVICE

(71) Applicant: EXERGYN LIMITED, Dublin (IE)

(72) Inventors: Barry Cullen, Dublin (IE); Georgiana Tirca-Dragomirescu, Dublin (IE); Kevin O'Toole, Dublin (IE); Keith Warren, Dublin (IE); Ronan Byrne, Dublin (IE); Robert Kelly, Dublin (IE)

(*) Notice: Subject to any disclaimer, the term of this patent is extended or adjusted under 35 U.S.C. 154(b) by 33 days.

(21) Appl. No.: 15/536,931

(22) PCT Filed: Dec. 16, 2015

(86) PCT No.: PCT/EP2015/080102
§ 371 (c)(1),
(2) Date: Jun. 16, 2017

(87) PCT Pub. No.: WO2016/097060
PCT Pub. Date: Jun. 23, 2016

(65) Prior Publication Data
US 2018/0149141 A1    May 31, 2018

(30) Foreign Application Priority Data
Dec. 16, 2014 (GB) .................................. 1422406.7

(51) Int. Cl.
F03G 7/06 (2006.01)
(52) U.S. Cl.
CPC .................................. F03G 7/065 (2013.01)

(58) Field of Classification Search
CPC . F03G 7/06; F03G 7/065; F16G 11/00; F16G 11/02; F16G 11/025; F16G 11/03
See application file for complete search history.

(56) References Cited

U.S. PATENT DOCUMENTS

| | | | |
|---|---|---|---|
| 4,197,708 A * | 4/1980 | Milton, Jr. | ............ F03G 7/065 60/527 |
| 4,302,939 A | 12/1981 | Golestaneh | |
| 4,759,187 A * | 7/1988 | O'Hare | .................... F03G 6/00 60/527 |
| 5,279,123 A | 1/1994 | Wechsler et al. | |
| 6,326,707 B1 | 12/2001 | Gummin et al. | |

FOREIGN PATENT DOCUMENTS

| | | |
|---|---|---|
| GB | 2022717 | 12/1979 |
| JP | 2005086981 A * | 3/2005 |

* cited by examiner

Primary Examiner — Mark A Laurenzi
Assistant Examiner — Xiaoting Hu
(74) Attorney, Agent, or Firm — Occhiuti & Rohlicek LLP

(57) ABSTRACT

An energy recovery device comprising a drive mechanism; an engine comprising a plurality of Shape Memory Alloy (SMA) Negative Thermal Expansion (NTE) elements fixed at a first end by a holder element and connected at a second end to a drive mechanism wherein a compensation mechanism is positioned and adapted to combat the shrinkage of the SMA or NTE elements encountered in heating cycles.

3 Claims, 14 Drawing Sheets a - Top cap
b - Bottom cap
c - Fixing wedge
d - SMA wire
e - Tightening screw
f - Nut Forced convection is enabled by having the rows of wires at a certain distance from each other Minimum surface area of contact in between the wires - conduction heat travsfer Dummy Rubber Wire Bundle Layout Examples O-Ring Bundle Spacers

OPTIMISED DIAMETRIC CONTRACTION OF A SMA ELEMENT FOR USE IN AN ENERGY RECOVERY DEVICE

CROSS REFERENCE TO RELATED APPLICATIONS

This application is a National Phase under 35 USC 371 of International Application No. PCT/EP2015/080102 filed on Dec. 16, 2015, which claims priority to Great Britain Application No. 1422406.7 filed Dec. 16, 2014, the contents of which are hereby incorporated by reference in their entirety.

FIELD

The present application relates to the field of energy recovery and in particular to the use of shape memory alloys (SMA) or Negative Thermal Expansion materials (NTE) for same.

BACKGROUND

Low grade heat, which is typically considered less than 100 degrees, represents a significant waste energy stream in industrial processes, power generation and transport applications. Recovery and re-use of such waste streams is desirable. An example of a technology which has been proposed for this purpose is a Thermoelectric Generator (TEG). Unfortunately, TEGs are relatively expensive. Another largely experimental approach that has been proposed to recover such energy is the use of Shape-Memory Alloys.

A shape-memory alloy (SMA) is an alloy that "remembers" its original, cold-forged shape which once deformed returns to its pre-deformed shape upon heating. This material is a lightweight, solid-state alternative to conventional actuators such as hydraulic, pneumatic, and motor-based systems.

A heat engine concept is under development which utilises Shape Memory Alloy (SMA) or another Negative Thermal Expansion (NTE) material as the working medium. In such an engine, for example as disclosed in PCT Patent Publication number WO2013/087490 and assigned to the assignee of the present invention, the forceful contraction of such material on exposure to a heat source is captured and converted to usable mechanical work.

Thus far, a useful material for such a working mass has been found to be Nickel Titanium alloy (NiTi). This alloy is a well known Shape-Memory Alloy and has numerous uses across different industries.

For example, NiTi wires form the working element of the engine. Force is generated through the contraction and expansion of these elements within the working core, via a piston and crank mechanism. The most important aspect of this system is the ability to secure the NiTi elements at both ends such that a strong and reliable union is created, enabling high-force, low displacement work to be performed for a maximum number of working cycles.

Nickle Titanium alloy is considerably harder and tougher than the steel material that might be used in the bundle holder. A problem is therefore that the NiTi elements wear or otherwise fatigue the steel elements at the points at which they are in contact. In the case of a friction fit bundle, this would be the boundary at which the outermost NiTi wire elements are located. In the case of "salt shaker" bundle holders, this would be the steel boundary point of contact for each wire hole.

It is therefore an object of the invention to provide a device and method to overcome the above mentioned problem.

SUMMARY

According to the invention there is provided, as set out in the appended claims, an energy recovery device comprising:
a drive mechanism;
an engine comprising a plurality of Shape Memory Alloy (SMA) Negative Thermal Expansion (NTE) elements fixed at a first end by a holder element and connected at a second end to a drive mechanism wherein a compensation mechanism is positioned and adapted to combat the shrinkage of the SMA or NTE elements encountered in heating cycles.

Understanding that the heating of the wire may give rise to diametrical contraction of the wire, the friction/interference bonds between wires, spacers and ultimately the brackets may be compromised (slippage or total failure of the bond). In order to combat this, a compensatory mechanism is included in the bundle holder whereby contraction of the wire is matched (exactly or approximately depending on the embodiment) by a linked movement of the bundle holder restraining elements. In so doing, a constant pressure bond is maintained between the wires, the spacing elements and the brackets.

In another embodiment there is provided an energy recovery device comprising: a drive mechanism;
an engine comprising a plurality of Negative Thermal Expansion (NTE) elements fixed at a first end by a holder element and connected at a second end to a drive mechanism wherein a reactive constant pressure fit system is positioned and adapted to combat the shrinkage of the wire encountered in heating cycles.

Understanding that the heating of the wire may give rise to diametrical contraction of the wire, the friction/interference bonds between wires, spacers and ultimately the brackets may be compromised (slippage or total failure of the bond). In order to combat this, a compensatory mechanism is included in the bundle holder whereby contraction of the wire is matched (exactly or approximately depending on the embodiment) by a linked movement of the bundle holder restraining elements. In so doing, a constant pressure bond is maintained between the wires, the spacing elements and the brackets.

In one embodiment the NiTi wires can be fixed in such a way that the high force developed by their contraction can be safely transmitted such that mechanical work can be produced.

In one embodiment an energy recovery device comprising:
a drive mechanism;
an engine comprising a plurality of Negative Thermal Expansion (NTE) elements fixed at a first end by a holder element and connected at a second end to a drive mechanism wherein a spring loaded clamping element adapted to ensure a constant pressure fit is maintained during thermal cycling.

In one embodiment the spring loaded clamping element comprises a free floating cantilever arm configured to act as a shock absorber during compression and expansion of the SMA or NTE elements.

In one embodiment said compensation mechanism comprises a telescopic element secured to a threaded fastener via at least one slider element.

In one embodiment the threaded fastener comprises a biasing spring.

In one embodiment there is provided a stablising SMA or NTE element adapted to provide a constant pressure fit on the at least one NTE or SMA element during thermal cycling.

In one embodiment there is provided an active bar element adapted to engage the compensation mechanism and the at least one NTE or SMA element.

In one embodiment there is provided a plate configured with an opening to secure the at least one NTE or SMA elements in place.

In one embodiment the SMA or NTE elements are arranged in parallel with a stem ball wedge to arrange the elements in a substantially circular profile.

In one embodiment a spacer element is positioned between the SMA or NTE elements.

In one embodiment the spacer element comprises an O-ring element.

In one embodiment the spacer element comprises a co-axially mounted sleeve mounted around at least some of the SMA or NTE elements.

BRIEF DESCRIPTION OF THE DRAWINGS

The invention will be more clearly understood from the following description of an embodiment thereof, given by way of example only, with reference to the accompanying drawings, in which:—

DETAILED DESCRIPTION OF THE DRAWINGS

The invention relates to a heat recovery system under development which can use either Shape-Memory Alloys (SMA) or Negative Thermal Expansion materials (NTE) to generate power from low grade heat.

Figure 1:
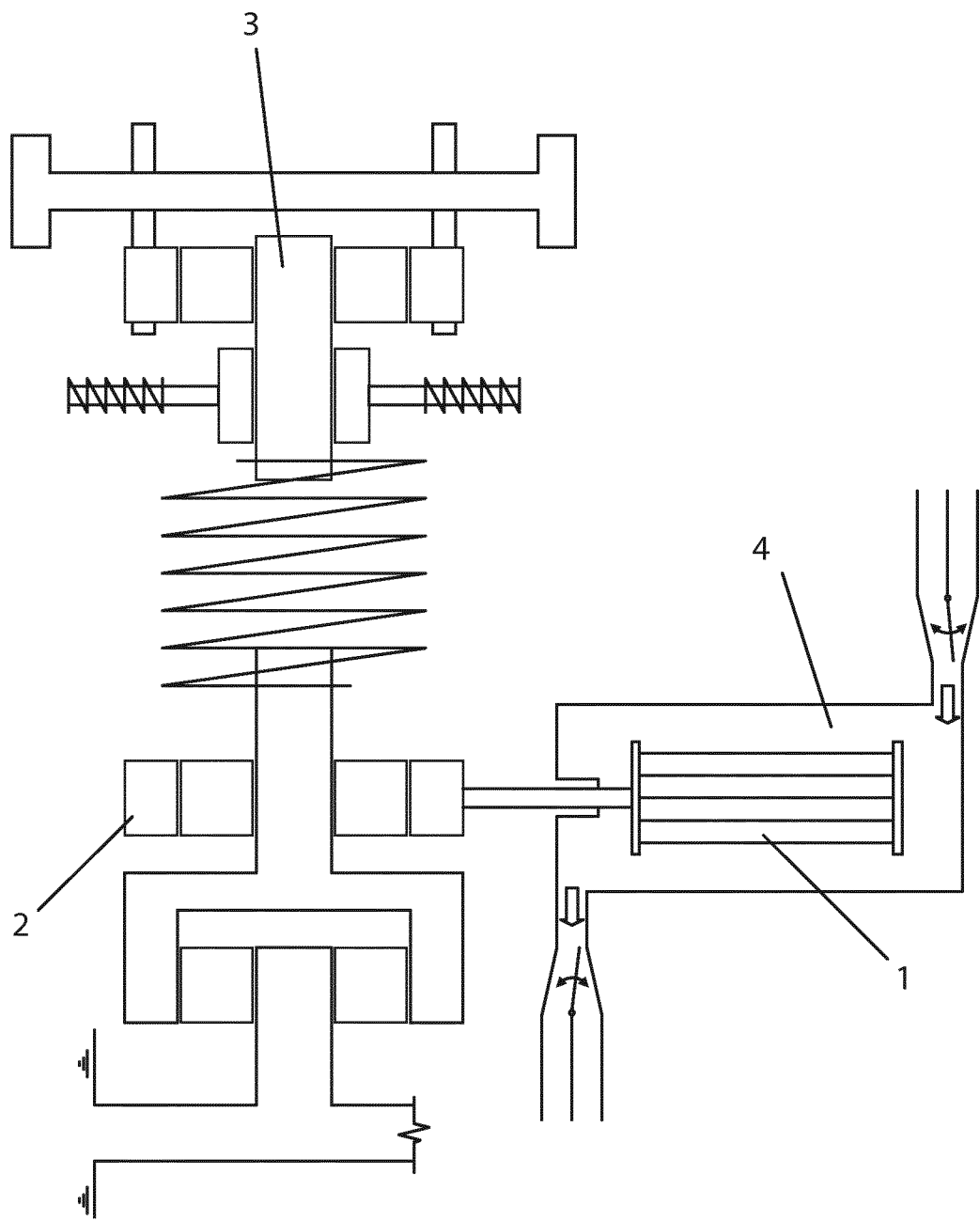
FIG. 1 illustrates a prior art energy recovery system using SMA or NTE materials.

An exemplary known embodiment of an energy recovery device will now be described with reference to FIG. 1 which provides an energy recovery device employing a SMA engine indicated by reference numeral 1. The SMA engine 1 comprises an SMA actuation core. The SMA actuation core is comprised of SMA material clamped or otherwise secured at a first point which is fixed. At the opposing end, the SMA material is clamped or otherwise secured to a drive mechanism 2. Thus whilst the first point is anchored the second point is free to move albeit pulling the drive mechanism 3. An immersion chamber 4 adapted for housing the SMA engine is also adapted to be sequentially filled with fluid to allow heating and/or cooling of the SMA engine. Accordingly, as heat is applied to the SMA core it is free to contract. Suitably, the SMA core comprises a plurality of parallel wires, ribbons or sheets of SMA material. Typically, a deflection in and around 4% is common for such a core. Accordingly, when a 1 m length of SMA material is employed, one might expect a linear movement of approximately 4 cm to be available. It will be appreciated that the force that is provided depends on the mass of wire used. Such an energy recovery device is described in PCT Patent Publication number WO2013/087490, assigned to the assignee of the present invention, and is incorporated fully herein by reference.

For such an application, the contraction of such material on exposure to a heat source is captured and converted to usable mechanical work. A useful material for the working element of such an engine has been proven to be Nickel-Titanium alloy (NiTi). The SMA actuation core is comprised of a plurality SMA material clamped or otherwise secured at a first point which is fixed.

In order to secure the SMA wires in the engine, it is required to develop a system that can anchor each wire at both ends, in such a fashion as will allow it to operate under high load. This system has been designated as the "bundle holder". The bundle holder should overcome two specific problems:

1) Transmit the high-force, low displacement load of the SMA wires during operation. This is a single degree of freedom (DOF) system whereby one end of the bundle is secured and remains stationary, whilst the opposing end is free to move in one axis of displacement to enable the movement of a piston, or other means, and the harnessing of the work.

2) Enable the close-packing of the SMA wires, insofar as possible, to enable maximum heat transfer from the transiting water to the wire and vice versa.

Such a core is described in UK patent application number 1409679.6, assigned to Exergyn Limited, and is incorporated fully herein by reference. In this application a core engine is described for use in an energy recovery device comprising a plurality of Shape Memory Alloys (SMA) or Negative Thermal Expansion (NTE) elements fixed at a first end and connected at a second end to a drive mechanism. The holder is a holder configured with a plurality of slots adapted to receive the plurality of Shape Memory Alloys (SMA) or NTE elements, for example Nickel Titanium alloy wires. The SMA wires are substantially elongated and arranged in a parallel orientation to make up a core that is housed in a chamber.

First Embodiment

As mentioned above thermal cycling of the SMA/NTE material will give rise to expansion and contraction of the active material. This expansion and contraction effectively gives rise to a fluctuating pressure fit at the boundaries of the wires and the bundle holder. This may have negative consequences for wear and fatigue. A means by which to prevent this is required.

Figure 2:
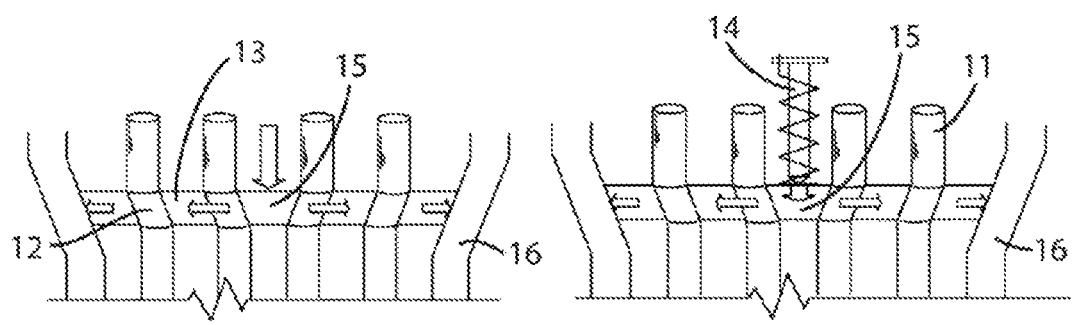
FIG. 2 illustrates a friction-fit bundle holder concept with a reactive constant pressure fit.

FIG. 2 illustrates a friction-fit bundle holder embodiment with a reactive constant pressure fit. In this instance, a reactive constant pressure fit system is put in place in order to combat the shrinkage of the wire encountered in heating cycles. It will be understood that the repeated contraction and expansion of the wire elements during thermal cycling can give rise to a fatigue regime in the bundle holder itself, wherein the wires (which may include Titanium within their alloy composition) may effectively begin to cut or otherwise wear the bundle holder bracket itself.

It is therefore of importance to devise means by which this effect may be counteracted or otherwise negated. One example of a method for achieving this is described here.

In the present invention, the bundle holder is set up as a series of concentric rings, with wire elements 11 placed between each ring, as shown in FIG. 2. The wires 11 are crimped 12 in place to enhance surface contact and thus, frictional contact with the bundle holder rings 13.

The crimping 12 of the wires 11 at an angle in this manner also enables the reactive pressure fit to be utilised effectively. To do this, a spring-loaded force element 14 is positioned at the central ring piece 15. The force element 14 is positioned so as to exert a pressure on the central ring 15. This pressure is transmitted through the outer rings via the wires 11 which are thus maintained in position. The force exerted by this element 14 is dictated by the selection of a suitable spring. The spring force is selected for such that the pressure exerted on the wires is actively maintained constant by the axial movement of the central bundle holder element 15 during the shrinking of the wire elements during the heating cycle.

In this manner, the force that is ultimately transmitted to the outer core wall 16 is kept uniform also. On the cooling cycle, where the wires are inclined to expand diametrically, the expansion of the wire elements would force the concentric bundle holder elements to return to their original position. If the spring element is not used, the wires could loosen in their seats and the position of the bundle holder would be compromised.

Second Embodiment

Figure 3:
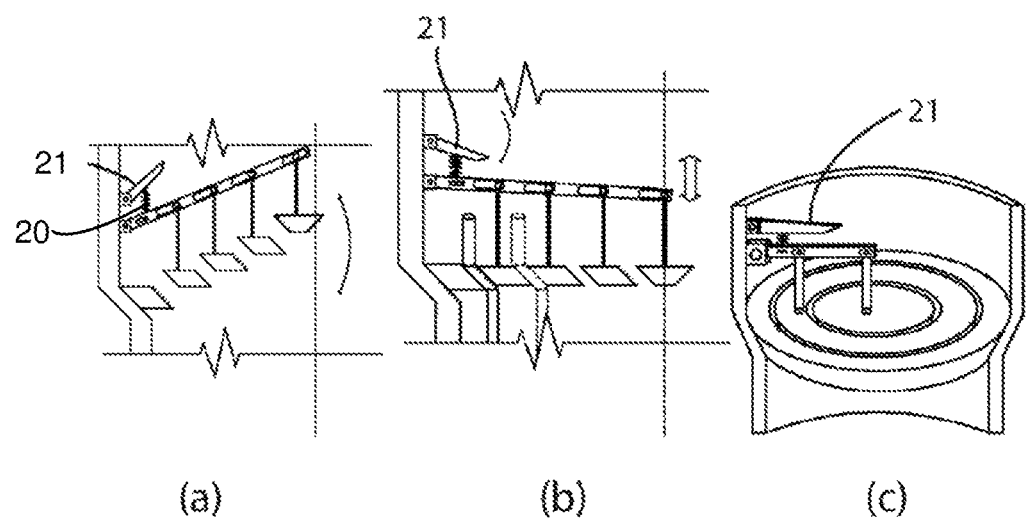
FIG. 3 illustrates a friction-fit bundle holder concept with a spring-loaded telescopic locking fit (a) unlocked, (b) locked, (c) pictorial cutaway view.

Securing the concentric rings of the bundle holder presented can be problematic. A means by which to assemble and secure the bundle holder, whilst ensuring a constant pressure fit is maintained during thermal cycling, is required, as illustrated in FIG. 3.

The invention provides for the inclusion of a spring loaded clamping element 20. In this manner, rather than a strict physical clamping mechanism, a cantilever arm 21 (and consequently the struts and the bundle holder rings) is free-floating, governed in its movement by the stiffness of the spring that is placed in compression when the clamp pawl is placed in the "locked" position.

During thermal cycling, therefore, any lateral contraction and expansion of the wire elements can be met by vertical motion of the bundle holder rings. This embodiment works in a similar way to a shock absorber such as would be encountered in vehicles and other systems.

Third Embodiment

Figure 4:
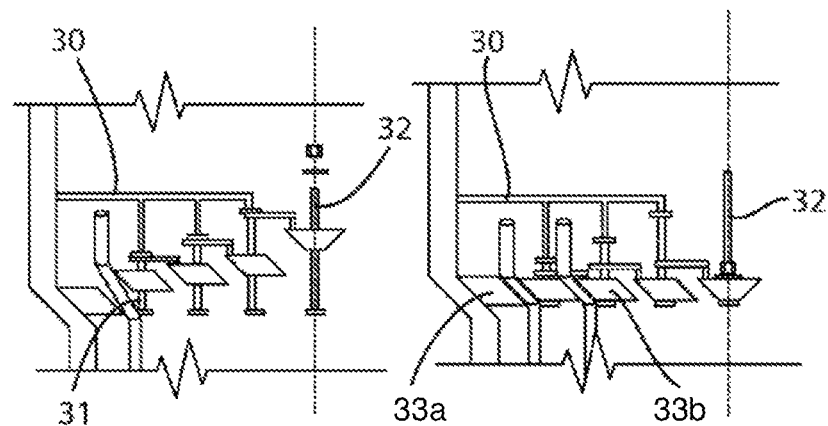
FIG. 4 illustrate a Friction-fit bundle holder concept with a telescopic locking fit.

A means by which to assemble and secure the bundle holder is disclosed. A further variant on the bundle holder concept is presented as illustrated in FIG. 4. In this embodiment, a telescopic element 30 is secured using a plurality of sliders 31 and a threaded fastener 32 rather than the hinged clamp system described previously.

This method has the advantage of enabling unencumbered sliding of the telescopic elements in the vertical axis. The use of the threaded fastener also has advantages in that it has the potential to allow precise torque setting of the union of wire elements together.

This has positive implications for ensuring that the strength of the clamping force acting on the wire terminals is not excessive, which could have implications for wire failure in the bundle holder.

Fourth Embodiment

In one embodiment securing the concentric rings of the bundle holder is a requirement. A means by which to assemble and secure the bundle holder, whilst ensuring a constant pressure fit is maintained during thermal cycling, is required.

Figure 5:
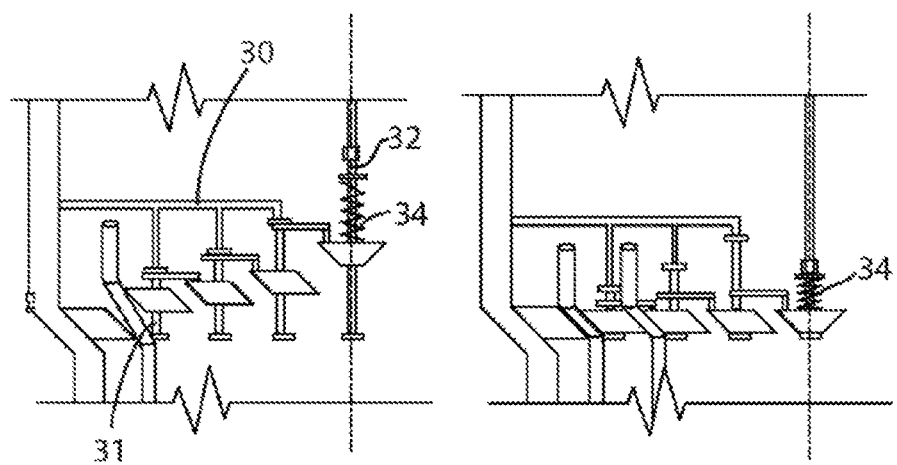
FIG. 5 illustrates an alternative embodiment of FIG. 4.

A variant of the embodiment shown in FIG. 4 is provided in FIG. 5 as shown. In the present embodiment, a telescopic bundle holder element 30 is realised with the use of vertical guides 31 which enable the concentric rings (two example concentric rings 33a and 33b are shown in FIG. 4) of the telescopic element to slide unencumbered in the vertical axis. A threaded fastener 32 is used on the central ring to secure the assembly in place and thus retain the wire terminals in place.

The present invention incorporates an additional element in the form of a spring or other biasing element 34, included in the threaded fastener sub assembly 32. This spring provides the additional benefit of enabling the telescopic element to "float"—i.e. it can accommodate fluctuations in the geometries of the enclosed wires, such as might be brought about during the thermal cycling of the system.

In this manner, a constant pressure fit may be attained, through the correct specification of the spring to enable a suitable resisting force to be maintained on the wires at all times.

Fifth Embodiment

Spring-actuated constant pressure fits, may not provide a constant pressure fit (unless a specific constant force spring is utilised) due to the progressive extension of the spring in certain circumstances. A means by which to avoid this pressure fluctuation is required.

A constant pressure friction-fit bundle holder is desirable. In this instance, a reactive constant pressure fit system is put in place in order to combat the shrinkage of the wire encountered in heating cycles.

Figure 6:
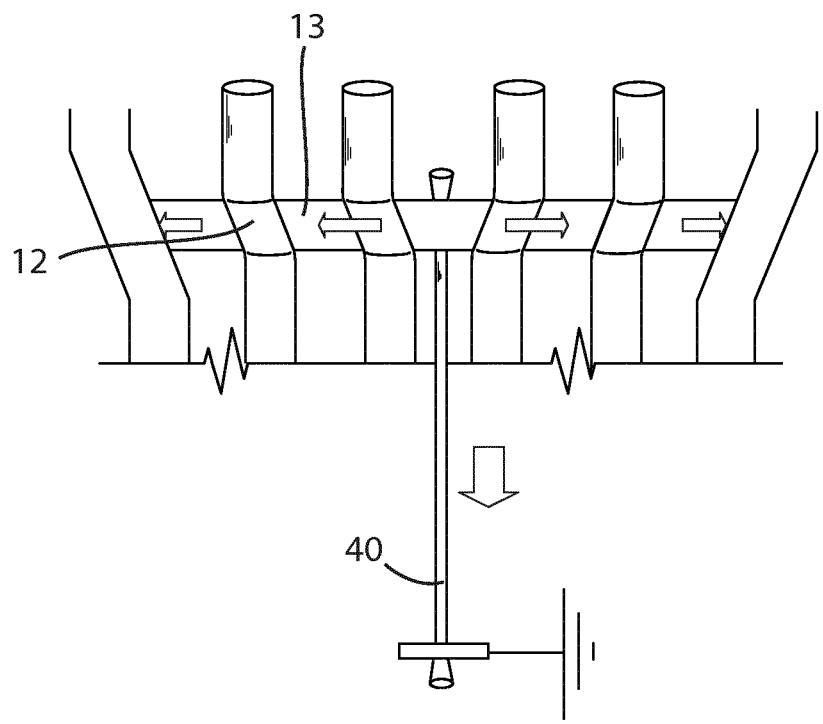
FIG. 6 illustrates a friction-fit bundle holder concept with active constant pressure fit with NiTi active element.

FIG. 6 presents a variation on the embodiment shown in FIG. 5. Instead of using a spring loaded element to provide a reactive force, it is proposed in the present invention to use an SMA element 40 to provide the reaction force.

In the present invention, an SMA element 40 is specified such that it can provide exactly the correct amount of force and displacement to bring about a constant pressure fit on the wire terminals during thermal cycling.

The SMA element 40 that is used to provide the force is positioned so that it is exposed to the transmitting fluid and thus is thermally cycled in the same intervals as the main bundle wires. Thus, an active pressure fit is created whereby the pressure fit is realised in exactly correct timing with the thermal cycle. In the previous reactive pressure fit, there is the possibility of—albeit potentially slight—mismatching of the reactive force and the wire expansion and contraction. The present invention can overcome this mismatching.

Sixth Embodiment

In another embodiment an active element is used to ensure a constant pressure fit is maintained in the bundle holder at all times.

Figure 7:
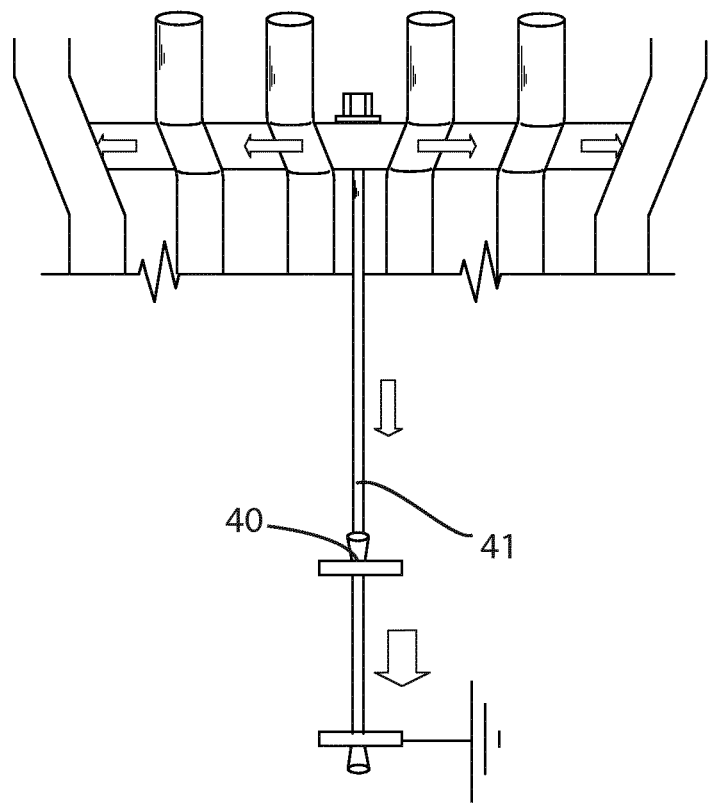
FIG. 7 illustrates a friction-fit bundle holder concept with reactive constant pressure fit with remote-mounted NiTi active element.

In the present embodiment, as shown in FIG. 7, the additional active material element 40 is held at a remove from the bundle holder itself by way of a structural bar element 41. The bar element 41 can be secured to the bundle holder by means of a threaded fastener.

Seventh Embodiment

Thermal cycling of the active material in the bundle will give rise to expansion and contraction of the material. This expansion and contraction will cause fatiguing of the bundle holder element unless otherwise counteracted.

In one embodiment there is provided a means by which to counteract the potential fatigue effects of the expansion and contraction of the wire elements in the bundle. The present invention is a bundle holder that flexes in reaction to this expansion and contraction. As described above, an active SMA element is utilised, placed in the stream of the heating fluid, to cause the bundle holder to contract.

Figure 8:
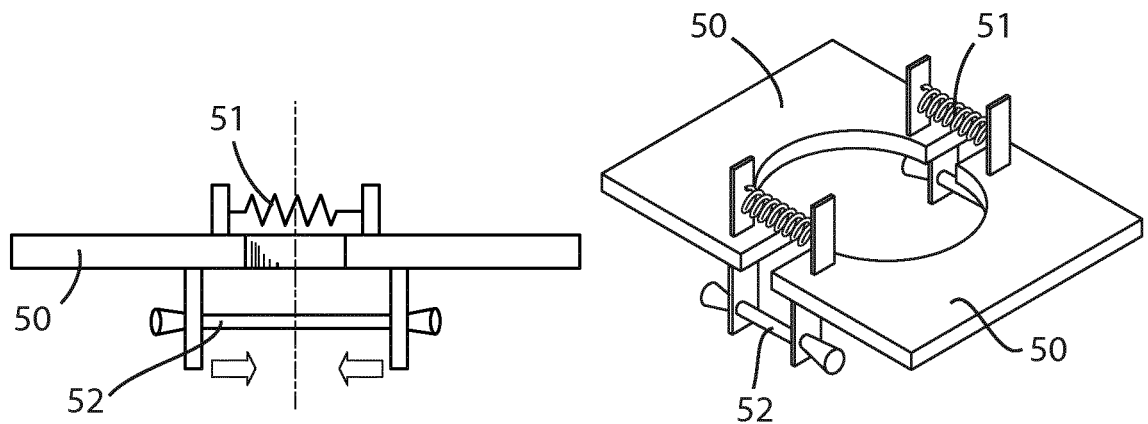
FIG. 8 illustrates a friction-fit bundle holder concept with reactive constant pressure fit with transverse-mounted NiTi active element.

The bundle holder in this instance is comprised of a split plate 50, retaining the bundled wires at its centre within a central opening or hole. This is illustrated in FIG. 8. The two plate elements 50 are separated using lateral mounted springs 51 on one side and lateral mounted SMA elements 52 on the underside. The SMA is mounted within the fluid flow. The springs offer resistance force against the SMA and act to return the bundle holder to its starting position during the cooling cycle of the system.

Eighth Embodiment

Force is generated through the contraction and expansion of this alloy (presented as a plurality of wires) within the working core, via a piston and transmission mechanism. The most important aspect of this system is the ability to secure the wire elements at both ends such that a reliable assembly is created, enabling high-force, low displacement work to be performed for a maximum number of working cycles.

In order to secure the plurality of wires in a reliable and durable fashion a system/device capable of anchoring them at both ends has to be developed. This system has to operate under high load. This assembly has been designated as the "bundle holder".

The bundle holder must overcome some specific problems:
1) Transmit the high-force, low displacement load of the wires during operation.
2) Enable the close-packing of the wires, insofar as possible, to enable maximum heat transfer from the transiting water to the wire and vice versa.
3) From a manufacturing point of view, it has to eliminate the tedious and strenuous process of placing hundreds of these wires in some sort of support and reduce production time and costs.

In one embodiment the arrangement of the SMA wires are in straight lines, allowing for a more compact arrangement while guaranteeing equal exposure to the fluid.

The top unit is pressed into position, compressing the SMA wires into a friction lock. Compression screws are employed to hold the units together when in their locked state. The top and mid layers can be moulded or cast as the shapes are more basic than conical approaches and they are non-load bearing. The bottom unit acts as the anti-bending bundle support and must be cast from a high tensile material.

Figure 9A:
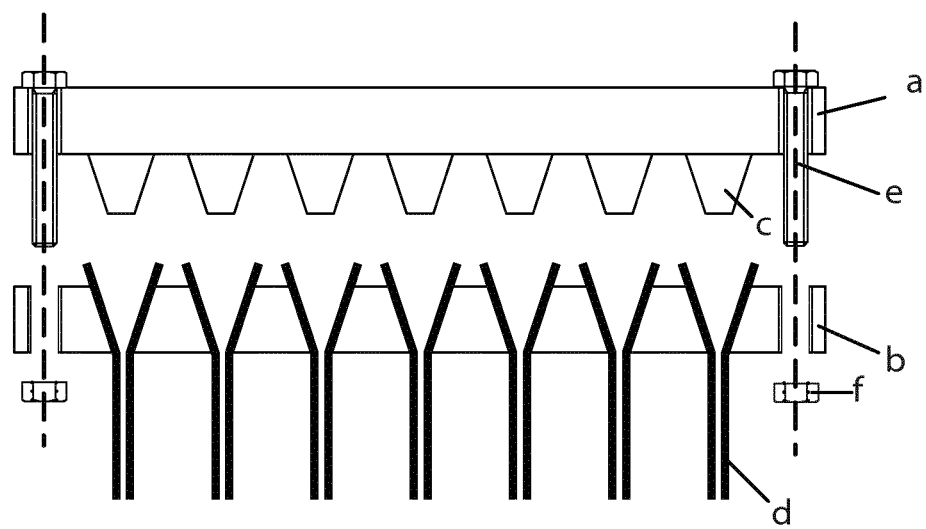
FIG. 9(a) illustrates a schematic representation of the components of the bundle holder.
Figure 9B:
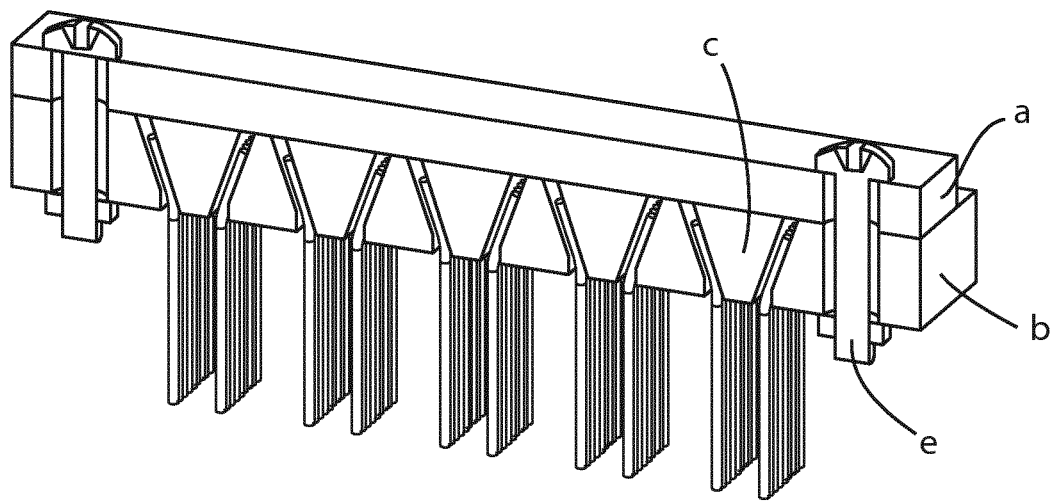
FIG. 9(b) illustrates a 3D view of the assembled bundle holder according to one embodiment of the invention.
Figure 9C:
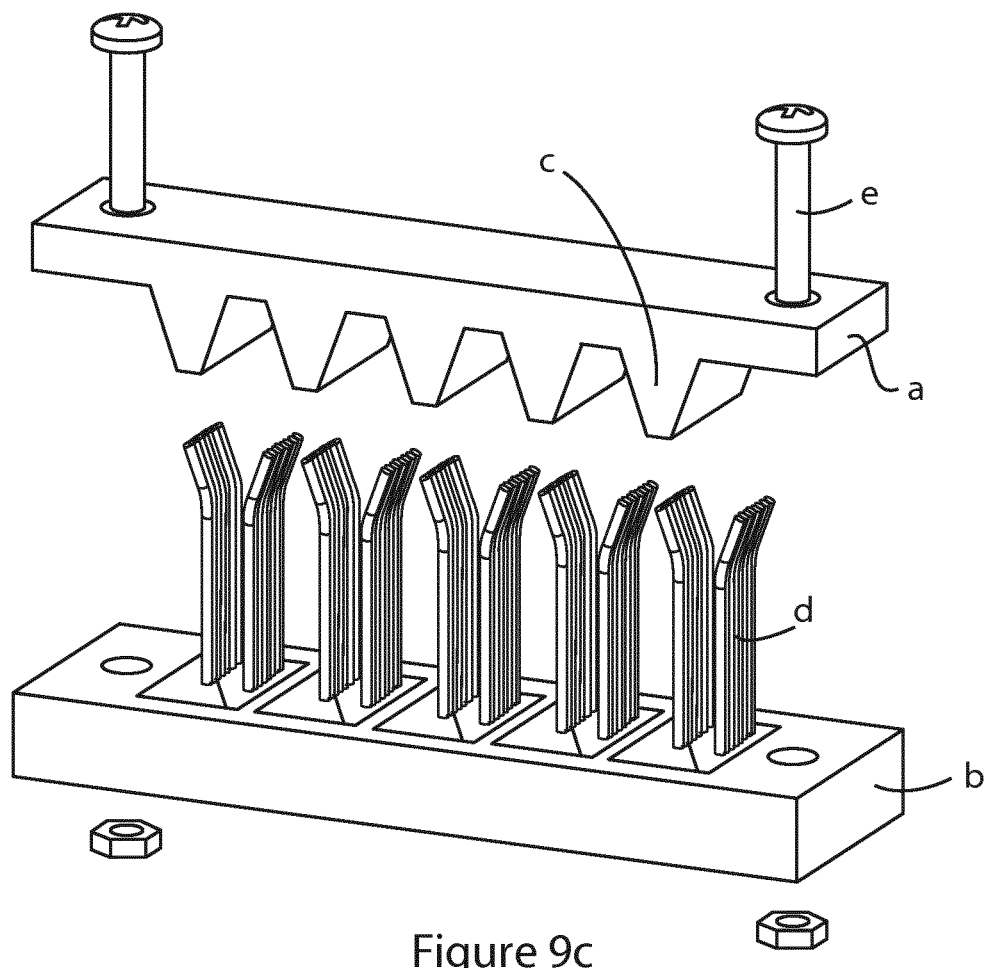
FIG. 9(c) illustrates a 3D view of the assembly process of the bundle holder in an unsecured position.
Figure 9D:
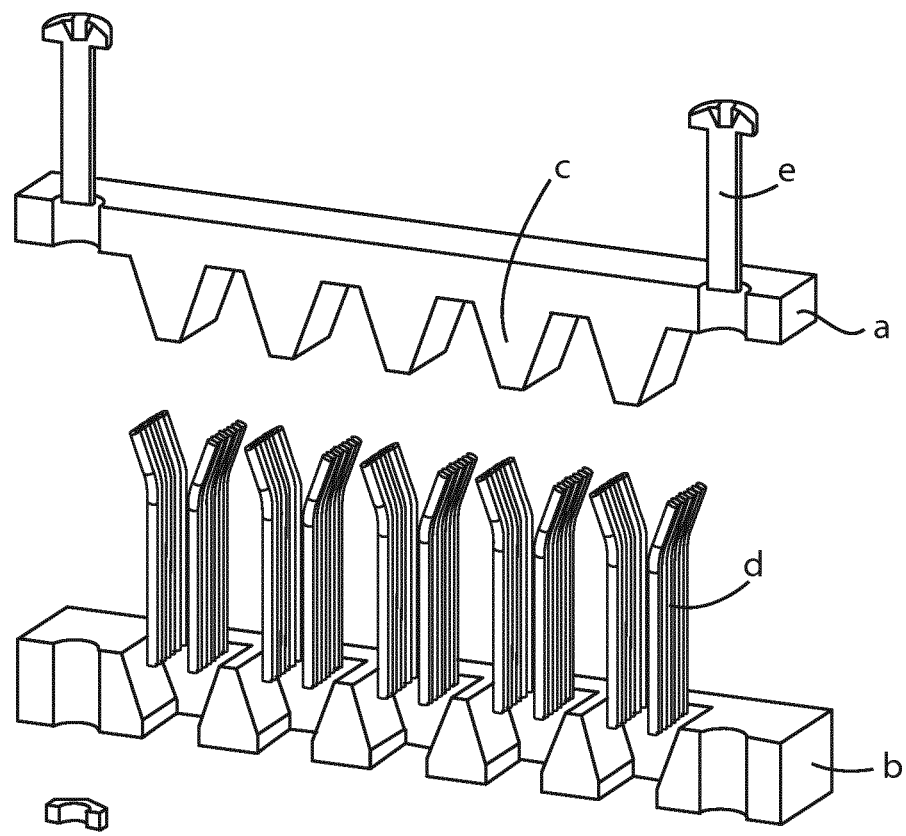
FIG. 9(d) is a 3D exploded section view of the assembly process of the bundle holder.

FIG. 9(a) illustrates a schematic representation of the components of the bundle holder. FIG. 9(b) illustrates a 3D cut through section view of the assembled bundle holder in a secure position according to one embodiment of the invention. FIG. 9(c) illustrates a 3D view of the assembly process of the bundle holder in an unsecured position. FIG. 9(d) is a 3D exploded section view of the assembly process of the bundle holder.

The embodiment shown in FIGS. 9a to 9d solves the problem of swaging wires individually and it would use a tightening screw and nut (e, f) (in between the top and bottom cap (a, b)) to fix them into place.

Coupling two rows of wires might delay the heat transfer or make it unequal, so in order to stop the two rows of wires from touching, the fixing wedge (c) can be made longer and in this way will split the rows, i.e. enhancing heat transfer and acting as turbulators in the wire bundle core.

Figure 10:
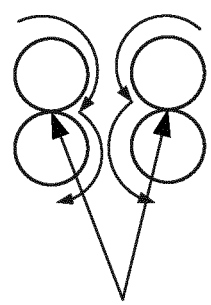
FIG. 10 is a snapshot of the fluid circulation in between wedged wires.

FIG. 10 is a plan view of the fluid circulation in between wedged wires during operation.

Ninth Embodiment

In order to secure the plurality of wires in a reliable and durable fashion a system/device capable of anchoring them at both ends has to be developed. This system has to operate under high load. This assembly has been designated as the "bundle holder".

The bundle holder must overcome some specific problems:
1) Transmit the high-force, low displacement load of the wires during operation.
2) Enable the close-packing of the wires, insofar as possible, to enable maximum heat transfer from the transiting water to the wire and vice versa.
3) From a manufacturing point of view, it has to eliminate the tedious and strenuous process of placing hundreds of these wires in some sort of support and reduce production time and costs.

Figure 11:
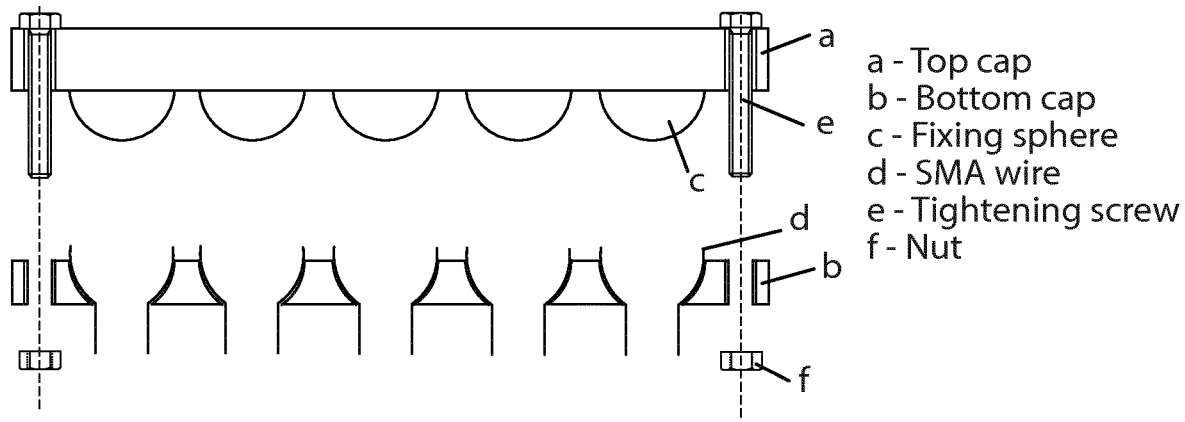
FIG. 11 illustrates a schematic drawing of the bundle holder using a wedging technique to fix unswaged SMA wires.

Instead of arranging the wires in a line a stemball (c, d) inspired wedge can be used to arrange the wires in groups on a circular profile. This embodiment provides a more compact arrangement while guaranteeing equal exposure to the fluid. FIG. 11 illustrates a schematic drawing of the bundle holder using a wedging (c, d) technique to fix unswaged SMA wires.

The top unit is pressed into position, compressing the SMA wires into a friction lock. Compression screws are employed to hold the units together when in their locked state. The top and bottom layers can be moulded or cast. The bottom unit acts as the anti-bending bundle support and must be cast from a high tensile material.

Figure 12:
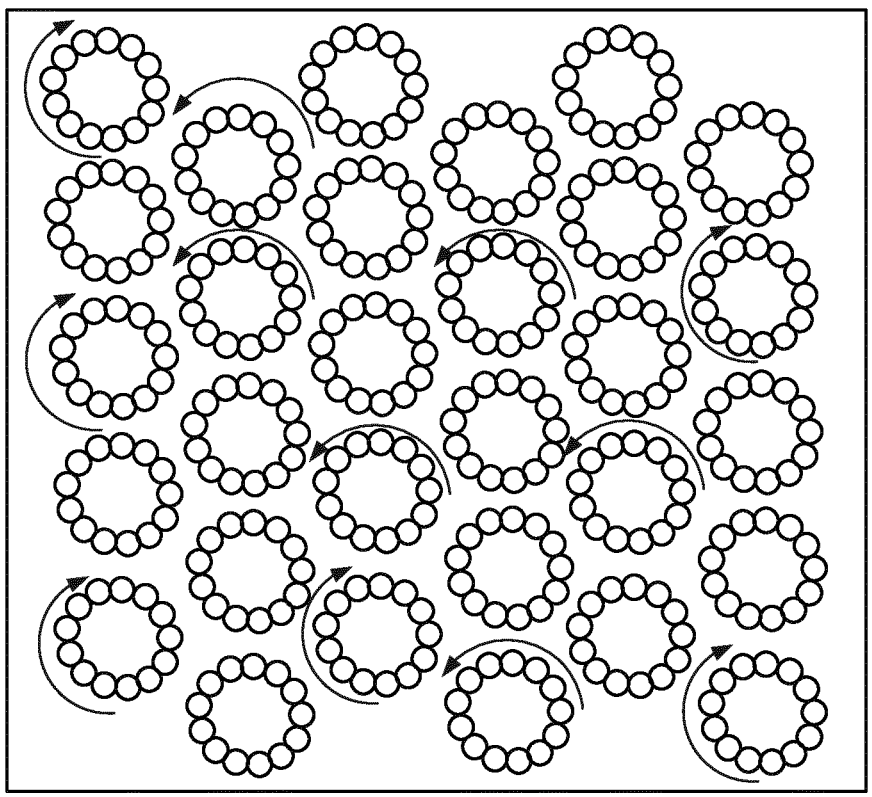
FIG. 12 illustrates flow paths in between the rows of SMA.

For this embodiment the wires are grouped in circular profiles and heat transfer is increased by means of arranging the groups of wires within the bundle holder. In this way turbulence is created by means of staggering the groups of wires. The flow paths caused by the turbulence are shown in FIG. 12 with the arrows showing the flow paths of the fluid in use.

Tenth Embodiment

In order for a core of SMA wires to actuate a piston, a method must be identified for fixing a bundle of wires so that one end is fixed to the top of the core and the other end is attached to the piston.

A friction fit is one possible way of securing wires together. Basically a friction fit is where the roughness of two surfaces is used to prevent slippage or movement of an object. The effectiveness of the fit is determined by the coefficient of friction for each surface, the area of contact and the pressure between the surfaces.

Figure 13:
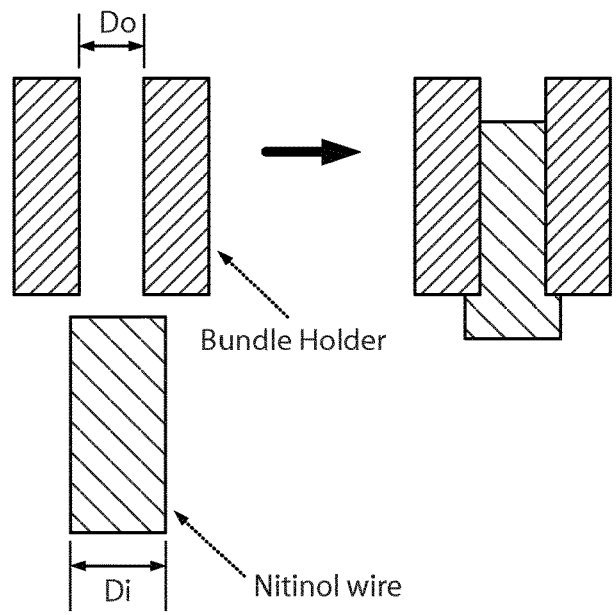
FIG. 13 shows a schematic of how a press fit embodiment can be used to secure a wire into a bundle holder.

FIG. 13 shows a schematic of how a press fit embodiment can be used to secure a wire into a bundle holder. Press fits are commonly used when securing bearings to shafts or housings. A press fit works by pressing an object of Di into a bore of size Do, where Do is smaller than Di. The result is that the two surfaces are pressurised together therefore increasing the friction between them and also the required force to separate them.

This concept can be applied to a SMA wire and a holder. The wire would have a larger outer diameter than the bore of the holder. The wire would then be press-fitted into the bore. The force to insert/remove the wire would solely depend on the amount of interference present between the wire and holder.

Eleventh Embodiment

A friction fit is one possible way of securing wires together. Basically a friction fit is where the roughness of two surfaces is used to prevent slippage or movement of an object. The effectiveness of the fit is determined by the coefficient of friction for each surface, the area of contact and the pressure between the surfaces.

Figure 14:
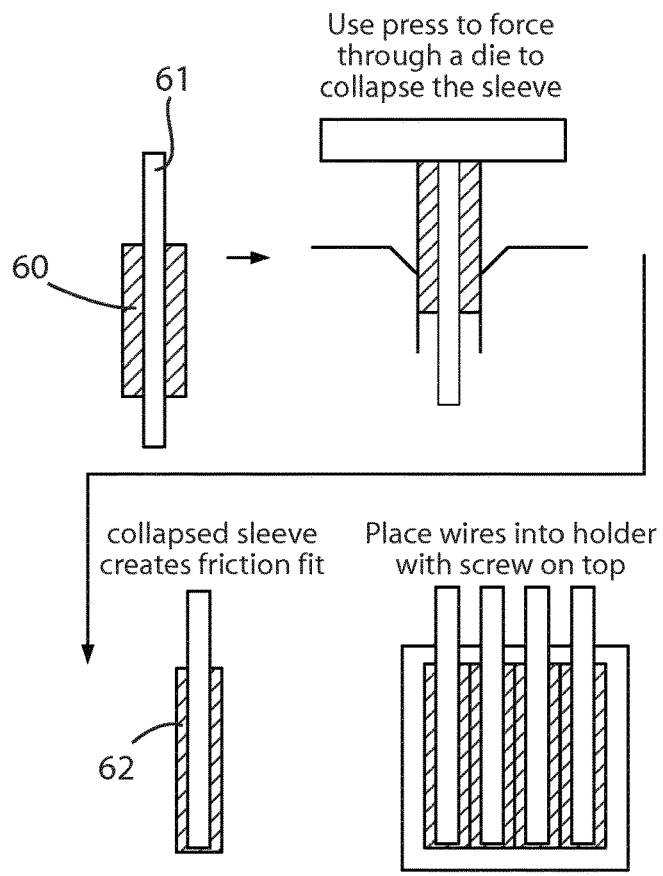
FIG. 14 shows a possible method of creating a friction fit, according to one embodiment.

FIG. 14 shows a possible method of creating a friction fit. As can be seen this embodiment is closely related to a pressure fit previously described. In this embodiment a sleeve 60 is loosely placed over the wire 61. The components are then secured in a die where a hydraulic press is used to press it through the die. As the sleeve passes through the die, it is crushed over the outside of the wire. This is caused by the bore of the die being gradually reduced. As it is crushed it creates a friction fit. When the components exit the die the sleeve's 62 wall thickness will have reduced and its length increased.

This procedure is repeated for both ends of the wire. The wires are then placed in a hollow bundle holder. A slotted cap 65 is placed over the top of the bundle holder. This cap can be made to either screw on or to be bolted onto the holder. This prevents the wire from pulling out of the holder.

Figure 15:
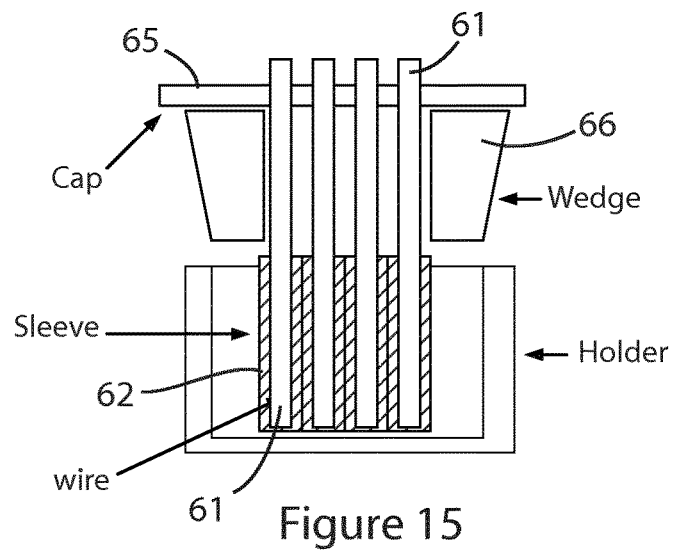
FIG. 15 illustrates an alternative embodiment where a wedge is added to the bundle holder shown in FIG. 14.

Another alteration that could be made to the bundle holder is the addition of a wedge 66 as shown in FIG. 15. The wedge would be placed in at the side of the holder. When the cap 65 is screwed or bolted down, the side of the wedge is forced inwards. This causes the sleeves to have a constant force on their exterior during service which helps to maintain the friction between the wire and sleeve. The idea of using a wedge 66 is similar in principal to a swage-less terminal concept.

Twelfth Embodiment

Force is generated through the contraction and expansion of this alloy (presented as a plurality of wires) within the working core, via a piston and transmission mechanism. The most important aspect of this system is the ability to secure the elements at both ends such that a reliable assembly is created, enabling high-force, low-displacement work to be performed for a maximum number of working cycles.

In one embodiment a method of separating the SMA wires contained within the holder embodiment discussed above is provided, whereby this separation will provide a greater and more uniform heat transfer to the wires contained within the bundles. These spacers could be realised in various formats. In addition to this, it could be possible to maintain as autonomous an assembly as possible through probability distribution and optimised proportion of the SMA wire and spacers.

Figure 16:
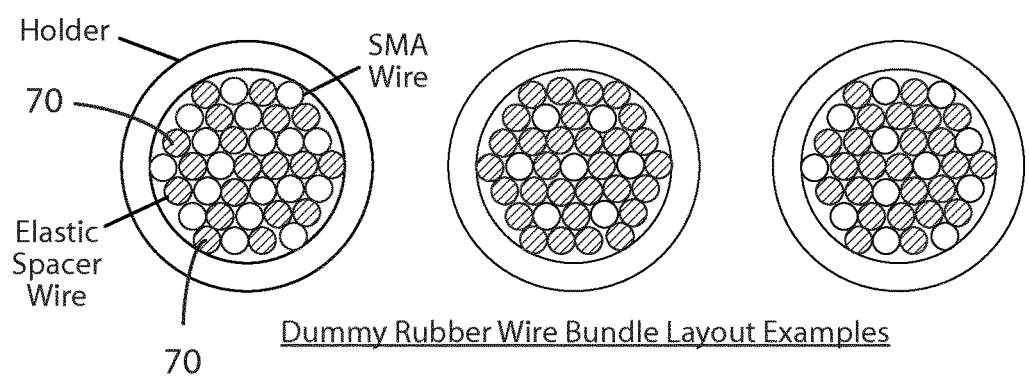
FIGS. 16 & 17 illustrate an embodiment of elastic "dummy" wires for use in an energy recovery device.
Figure 17:
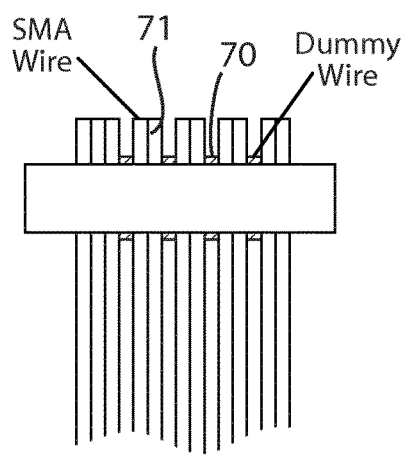

An embodiment of elastic "dummy" wires is shown in FIGS. 16 and 17. This embodiment tackles the issue of spacing wires which are secured using a friction fit. The spacing of the wires 71 may be important from a thermodynamic viewpoint, hence, the use of "dummy" wires 70 in a bundle which will act as spacers may be advantageous. These wires 70 can provide a method of keeping the wires separated while neither contributing to nor hindering the output of the bundle. The same wires will need only be of a length equal to that of the bundle holder in order to prevent them from interfering with heat exchange to the SMA wire 71 contained further within the core. Furthermore, this embodiment can provide a solution to the issue of wire slippage when heated due to their radial contraction. The prevention of this could be achieved by using dummy wires which consist of an appropriately elastic material (tough rubber). This will allow for the bundle to be "over" tightened when the wire is in its cold state in order to compensate for the lost grip during wire heating/contraction. The excess force applied would be elastically absorbed by the dummy wires when the Nitinol is in its cooled state, and the normally required force would be applied when the Nitinol wires are contracted, where the dummy wires 70 will allow for this slack or loss of grip by returning to a less deformed state. FIG. 16 shows examples of Nitinol and dummy wire layouts, whereas FIG. 17 shows the length of the dummy wires 70 relative to the SMA wire 71.

Figure 18:
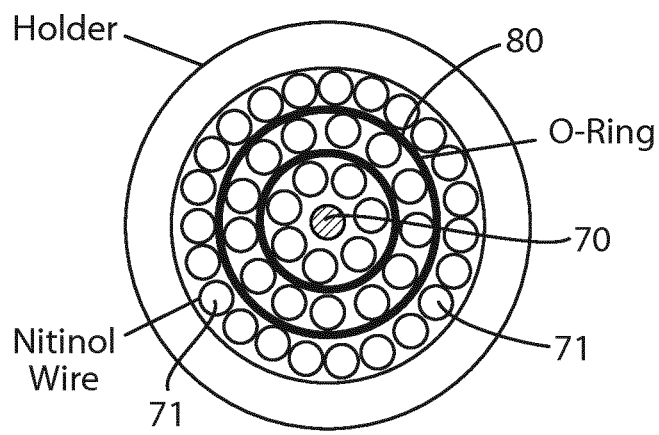
FIG. 18 illustrates an embodiment of one or more O rings for use in an energy recovery device.

This embodiment may also be realised in an alternative format whereby O-rings 80 may be used to perform a similar function. However, where the wire spacers are arranged axially with respect to the Nitinol wires, the O-rings can be arranged radially. This embodiment is illustrated below in FIG. 18, where there is a central dummy wire spacer 70 implemented, as an O-ring would not be suitable.

Figure 19:
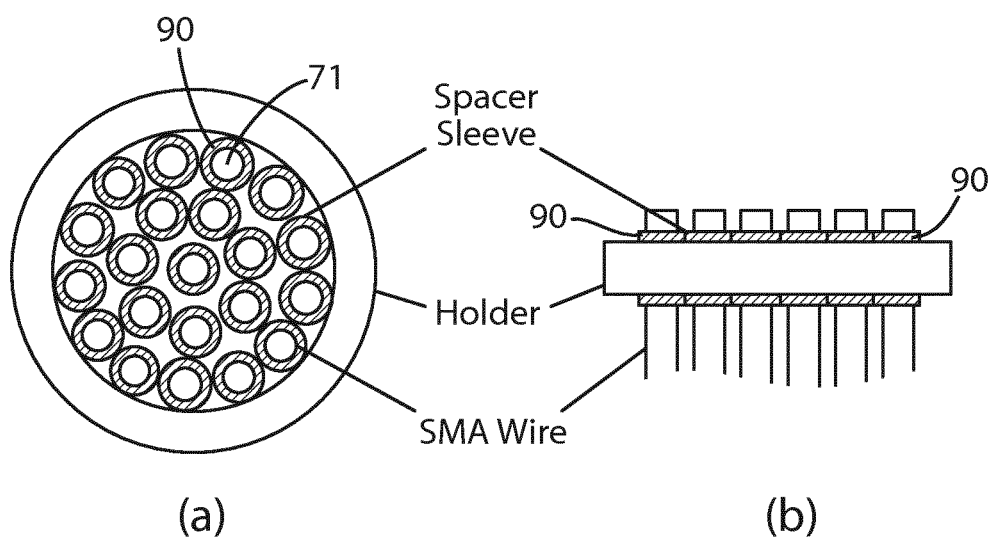
FIG. 19 is an Illustration of a sleeve spacer concept from a top view (a), and side view (b).

Another embodiment of this concept is to implement the spacer elements 90 as sleeves, which would be co-axially mounted around the tips of the SMA wires contained within the bundles. These sleeves 90 allow for greater ease of assembly during bundle preparation, as they will provide a fixed spacer element as opposed to the loose wires discussed previously. This concept is illustrated in FIG. 19.

Thirteenth Embodiment

Force is generated through the contraction and expansion of this alloy, presented as a plurality of wires, within the working core, via a piston and transmission mechanism. The most important aspect of this system is the ability to secure the NiTi elements at both ends such that a reliable assembly is created, enabling high-force, low displacement work to be performed for a maximum number of working cycles.

The problem this embodiment aims to solve is how to fix the wires at both ends in a way that allows the contraction of the wire to be harnessed and converted into usable energy.

Figure 20:
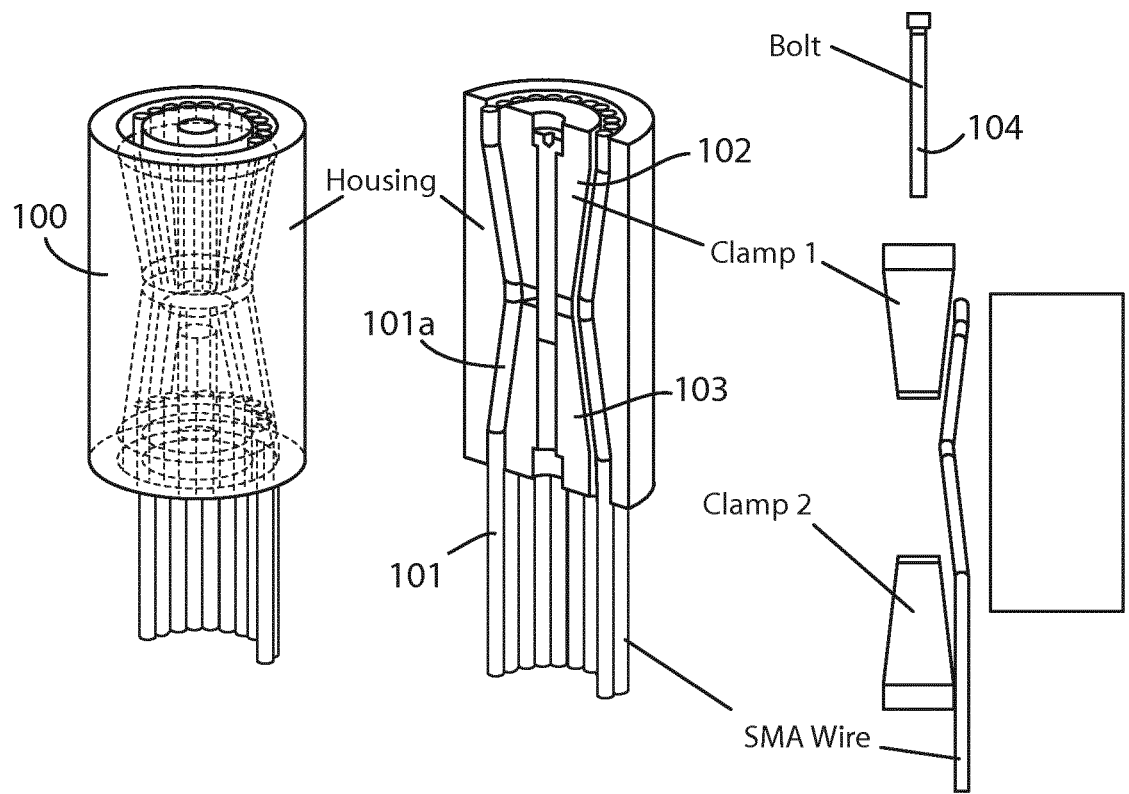
FIG. 20 illustrates feeding a number of SMA wires through the centre of a cylindrical housing, according to one embodiment.

This concept involves feeding a number of SMA wires 101 through the centre of a cylindrical housing 100, as illustrated in FIG. 20. The top of the wires 101a are flared using an initial clamp 102 which can be seen. A secondary clamp 103 is fed into the underside of the housing 100, flaring the wires again. A bolt 104 is fed through the centre of both clamps 102, 103, fixing them together and holding the SMA wires in place. The friction applied to the SMA wire 101 by the clamps can be increased by tightening the bolt holding the clamps together.

Fourteenth Embodiment

Force is generated through the contraction and expansion of this alloy (presented as a plurality of wires) within the working core, via a piston and transmission mechanism. The most important aspect of this system is the ability to secure the wire elements at both ends such that a reliable assembly is created, enabling high-force, low displacement work to be performed for a maximum number of working cycles.

The problem this embodiment aims to solve is how to fix the wires at both ends in a way that allows the contraction of the wire to be harnessed and converted into usable energy.

Figure 21:
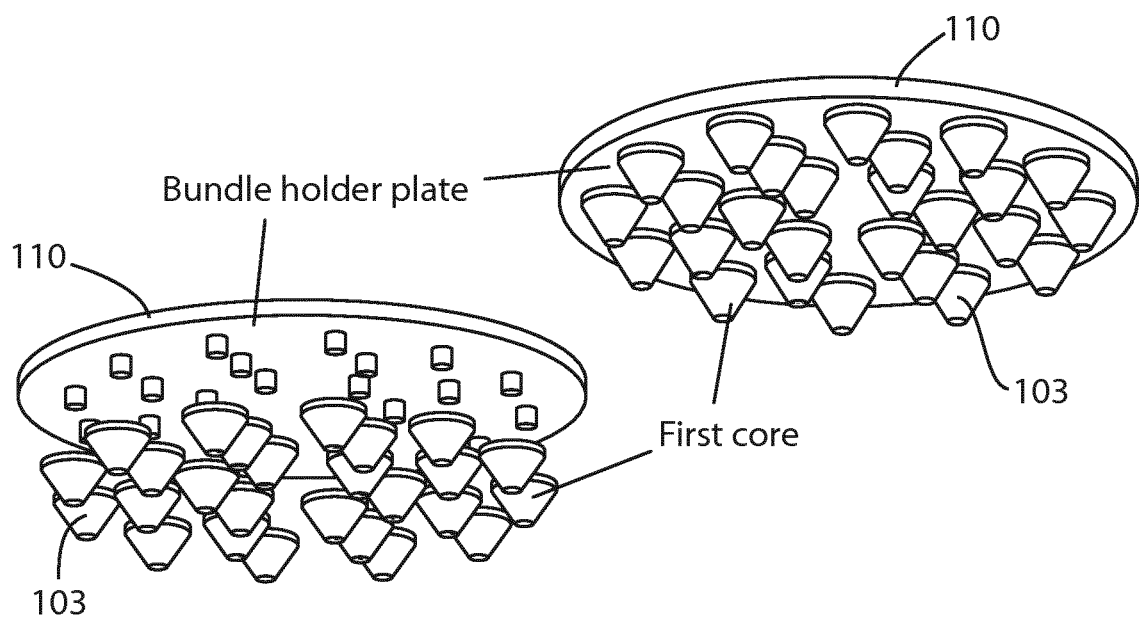
FIGS. 21, 22 and 23 illustrate a bundle holder plate for securing the wires in place.
Figure 22:
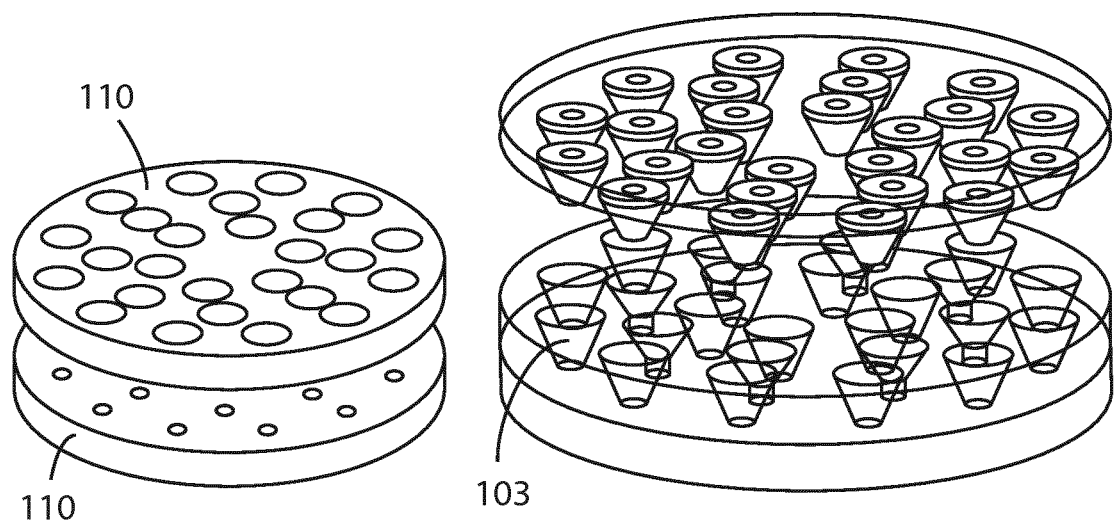
Figure 23:
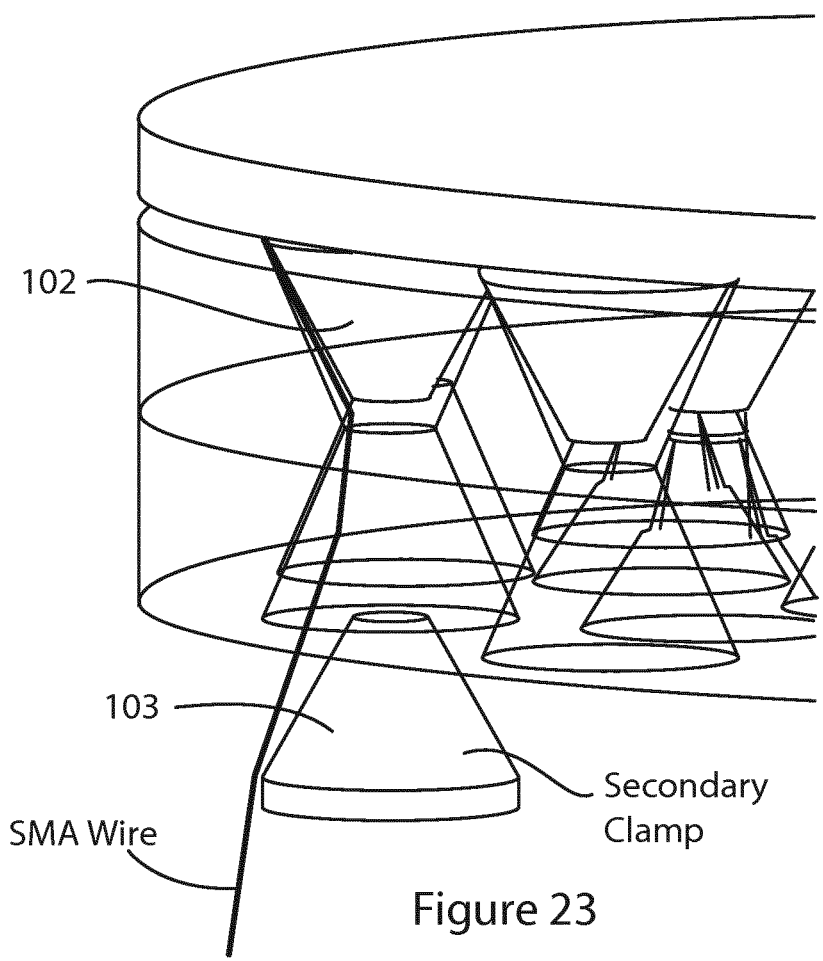

Instead of using individual bundles of wires and holding them together using a bundle holder, one embodiment incorporates the clamps 103 used to flare out the wires into a bundle holder plate as shown in FIG. 21. The wire is again fed up through openings or holes in the central housing and flared out with the cores mounted to the bundle holder plate 110, as shown in FIGS. 22 and 23. The bundle holder plate can then be fixed to the central housing with bolts.

The wires can be fixed in place with a second clamp 103 which can be seen in FIG. 23. This second clamp is fixed to the clamp plate with a bolt and can be tightened to increase the friction observed by the wire.

Fifteenth Embodiment

Force is generated through the contraction and expansion of this alloy (presented as a plurality of wires) within the working core, via a piston and transmission mechanism. The most important aspect of this system is the ability to secure the SMA elements at both ends such that a reliable assembly is created, enabling high-force, low displacement work to be performed for a maximum number of working cycles.

The problem this embodiment aims to solve is how to fix the wires at both ends in a way that allows the contraction of the wire to be harnessed and converted into usable energy.

Figure 24:
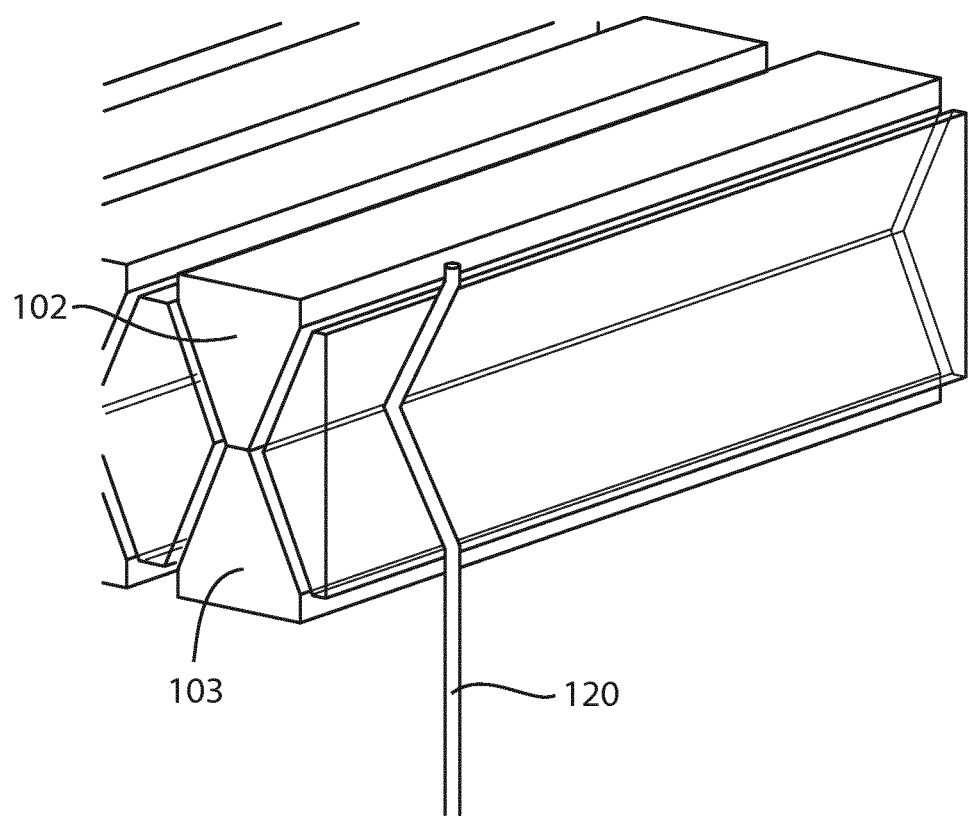
FIG. 24 illustrates how the wires can be clamped in position according to another embodiment.

The SMA wires 120, as shown in FIG. 24, are fed through a central opening or hole and clamped in place using a top and bottom clamp 102, 103, the friction observed by the wires can be adjusted by tightening a bolt holding the clamps together.

In the specification the terms "comprise, comprises, comprised and comprising" or any variation thereof and the terms include, includes, included and including" or any variation thereof are considered to be totally interchangeable and they should all be afforded the widest possible interpretation and vice versa.

The invention is not limited to the embodiments hereinbefore described but may be varied in both construction and detail.

The invention claimed is:

1. An energy recovery device comprising:
   an engine comprising a plurality of Shape Memory Alloy (SMA) or Negative Thermal Expansion (NTE) elements fixed at a first end by a holder element and connected at a second end to a drive mechanism, the SMA or NTE elements being substantially elongated and arranged in a parallel orientation to make up a core; and
   a compensation mechanism positioned and adapted to combat a diametric shrinkage of the SMA or NTE elements encountered in heating cycles,
   wherein the compensation mechanism comprises at least one spacer element inserted between the SMA or NTE elements, wherein the at least one spacer element comprises an O-ring element.

2. The energy recovery device of claim 1, wherein the at least one spacer element of the compensation mechanism further comprises an elastic spacer wire between the SMA or NTE elements.

3. The energy recovery device of claim 1, wherein the at least one spacer element of the compensation mechanism further comprises a co-axially mounted sleeve mounted around at least some of the SMA or NTE elements.

* * * * *